United States Patent [19]
Madan et al.

[11] Patent Number: 5,275,888
[45] Date of Patent: Jan. 4, 1994

[54] PROCESS FOR THE PREPARATION OF A COMPOSITE STRUCTURE COMPRISING A CERAMIC ENAMEL LAYER AND POLYURETHANE LAYERS

[75] Inventors: Sanjeev Madan, Coraopolis; Hans-Joachim Kogelnik, Pittsburgh, both of Pa.; Majid Daneshvar, Leverkusen, Fed. Rep. of Germany; Richard S. Pantone, New Martinsville, W. Va.; Jan L. R. Clatty, Monaca, Pa.

[73] Assignee: Miles Inc., Pittsburgh, Pa.

[21] Appl. No.: 58,072

[22] Filed: May 4, 1993

Related U.S. Application Data

[62] Division of Ser. No. 788,968, Nov. 7, 1991, Pat. No. 5,233,009.

[51] Int. Cl.$^5$ ............ B32B 27/06; B32B 27/40; C09J 5/00
[52] U.S. Cl. .................. 428/423.3; 156/315; 428/425.5
[58] Field of Search ........... 156/315; 428/423.3, 428/425.5

[56] References Cited

U.S. PATENT DOCUMENTS

| | | | |
|---|---|---|---|
| 3,496,058 | 2/1970 | Schroter et al. | 161/119 |
| 3,714,127 | 1/1973 | Fabris et al. | 528/44 |
| 3,932,360 | 1/1976 | Cerankowski et al. | 528/64 |
| 3,979,364 | 9/1976 | Rowton | 528/76 |
| 4,053,545 | 10/1977 | Fay | 264/46.4 |
| 4,444,976 | 4/1984 | Rabito | 528/60 |
| 4,552,934 | 11/1985 | Rabito et al. | 525/458 |
| 4,664,982 | 5/1987 | Genovese et al. | 428/447 |
| 4,695,618 | 9/1987 | Mowrer | 528/55 |
| 4,743,672 | 5/1988 | Goel | 528/44 |
| 4,876,308 | 10/1989 | Melby et al. | 524/780 |
| 5,233,009 | 8/1993 | Madan et al. | 528/60 |

*Primary Examiner*—John Kight, III
*Assistant Examiner*—Rabon Sergent
*Attorney, Agent, or Firm*—Joseph C. Gil; N. Denise Brown

[57] ABSTRACT

A novel polyurethane prepared by reacting a) a specific polyol or specific polyol blend, b) an organic diamine, c) fillers, and d) a specific polyisocyanate is described. The invention also relates to the use of the polyurethane in the preparation of a composite structure wherein the polyurethane is applied to an adhesive coated ceramic enamel layer. The composites are eminently suitable for use in plumbing applications (e.g. as a bathtub).

4 Claims, No Drawings

PROCESS FOR THE PREPARATION OF A COMPOSITE STRUCTURE COMPRISING A CERAMIC ENAMEL LAYER AND POLYURETHANE LAYERS

This application is a division of application Ser. No. 07/788,968 filed Nov. 7, 1991, now U.S. Pat. No. 5,233,009.

BACKGROUND OF THE INVENTION

Composite structures produced from metal substrates having a ceramic enamel surface layer and plastic materials are known (see, e.g., U.S. Pat. No. 4,664,982). Such composites are typically used in various plumbing applications (e.g., such composites may be used as bathtubs). In such plumbing applications, the composites must be able to resist delamination over extreme temperature ranges (e.g., from −15° C. to 100° C.). Typical of the plastic materials used are unsaturated polyester resins, epoxies, polyurethanes, isocyanurates, and nylons. U.S. Pat. No. 4,664,982 describes the use of a variety of different silane materials as adhesives to assist in adhering the plastic material. In addition, composites of a wide variety of different substrates with foam materials are known (see, e.g., U.S. Pat. Nos. 3,496,058 and 4,053,545).

Solventless spray systems are also known (see, e.g., U.S. Pat. No. 4,695,618).

Polyurethane elastomers and adhesives having improved sag resistance are known. Such systems are typically cured using a diamine curing agent (see, e.g., U.S. Pat. Nos. 3,714,127, 3,932,360, 3,979,364, 4,444,976, 4,552,934, 4,743,672, and 4,876,308).

A commercially available system for application to a substrate was based upon a reaction mixture of: i) 86.8% by weight of a 455 molecular weight triol formed from propylene oxide and trimethylolpropane, 6.0% by weight of a 28 OH number triol from glycerin, propylene oxide and ethylene oxide (and having 82% primary hydroxyl group content), 2.3% by weight of xylene diamine, 4.7% of a moisture absorbing zeolite, and 0.2% of a tin catalyst, and ii) an isocyanate terminated prepolymer from an isocyanate and a polyether, having an NCO content of 27.4% by weight.

DESCRIPTION OF THE INVENTION

The present invention is broadly directed to a novel polyurethane and to a method of using such polyurethanes in the production of a composite structure. More particularly, the present invention is directed to a polyurethane prepared by reacting:

A) a polyol mixture comprising:
1) from 0 to 55 parts by weight, and preferably from 20 to 50 parts by weight, of a polyol having an OH number of from 500 to 750 and being prepared by reacting propylene oxide with a mono-, di- or trialkanolamine, or by reacting propylene oxide with a mono-, di-, or triamine,
2) from 25 to 100 parts by weight, and preferably from 25 to 55 parts by weight, of a triol having an OH number of from 200 to 325 and being prepared by reacting propylene oxide with a member selected from the group consisting of glycerin, trimethylolpropane, and mixtures thereof, and
3) from 0 to 55 parts by weight, and preferably from 20 to 50 parts by weight, of a triol having an OH number of from 20 to 50 and being prepared by reacting propylene oxide and ethylene oxide with a member selected from the group consisting of glycerin, trimethylolpropane, and mixtures thereof, said triol 3) having a primary hydroxyl content of from 50 to 90%, said parts by weight of 1), 2), and 3) totalling 100 parts by weight, B) from 1 to 5 parts by weight per 100 parts by weight of component A) of an organic diamine having a molecular weight of from 60 to 2000, and preferably from 100 to 400, C) from 0 to 10 parts by weight, and preferably from 2 to 6 parts by weight, per 100 parts by weight of component A) of one or more additives to absorb moisture, D) from 0 to 2 parts by weight per 100 parts by weight of component A) of one or more catalysts capable of catalyzing the reaction between an isocyanate group and a hydroxyl group, E) from 11 to 140 parts by weight, and preferably from 60 to 110 parts by weight, per 100 parts by weight of component A) of one or more fillers, F) from 0 to 2 parts by weight per 100 parts by weight of component A) of one or more silicone anti-foaming agents, and G) an isocyanate terminated prepolymer prepared by reacting a polyisocyanate with a polyether polyol, said prepolymer having an NCO content of from 18 to 35% by weight, at an equivalent ratio of isocyanate groups to isocyanate reactive groups of from 0.7:1 to 2.0:1, preferably from 0.97:1 to 1.55:1.

The invention is also directed to a process for the preparation of a composite structure comprising:
1) applying an aqueous anionic polyester polyurethane dispersion to the ceramic enamel layer of a metal substrate having a ceramic enamel layer on at least one side thereof,
2) allowing said dispersion to cure thereby forming an adhesive layer,
3) applying the above described reaction mixture onto said adhesive layer;
4) allowing said reaction mixture to fully react.

The dispersion of step 1) is preferably applied by spraying or by brushing.

All of the various reactants are known in the polyurethane art. The isocyanates useful as starting components for the production of the polyurethanes of the present invention are isocyanate terminated prepolymers having isocyanate group contents of from 18 to 35% by weight. The prepolymers are prepared by reacting a polyisocyanate with a polyether polyol. Useful polyether polyols include polyethers of the type generally used in the polyurethane art and include polyethers having hydroxyl functionalities of from 2 to 6, having OH numbers of from 20 to 700, and containing anywhere from 0 to 100% primary hydroxyl groups. The preferred polyethers have molecular weights of from 200 to 8000. Useful isocyanates include substantially any polyisocyanate. Preferred are polymethylene poly(phenyl isocyanates). These isocyanates are generally known and are produced by reacting phosgene with aniline/formaldehyde condensates. Known processes for preparing the aniline/formaldehyde condensates and the resultant polyisocyanates are described in the literature and in many patents, for example, U.S. Pat. Nos. 2,683,730, 2,950,263, 3,012,008, 3,344,162 and 3,362,979. Additionally useful isocyanates are described in U.S. Pat. No. 4,256,849, the disclosure of which is herein incorporated by reference.

The starting components used for the production of the polyurethanes of the present invention also include a variety of active hydrogen group containing compounds. More particularly, the active hydrogen containing compounds include certain specific polyols and certain specific diamines.

The polyols useful herein include:
1) polyols having OH numbers of from 500 to 750 and being prepared by reacting propylene oxide with a mono-, di- or trialkanolamine, or by reacting propylene oxide with a mono-, di-, or triamine,
2) triols having OH numbers of from 200 to 325 and being prepared by reacting propylene oxide with a member selected from the group consisting of glycerin, trimethylolpropane, and mixtures thereof, and
3) triols having OH numbers of from 20 to 50 and primary hydroxyl group contents of from 50 to 90%, and being prepared by reacting propylene oxide and ethylene oxide with a member selected from the group consisting of glycerin, trimethylolpropane, and mixtures thereof.

The hydroxyl compounds useful in producing the polyurethane are generally known in the polyurethane art. All that is necessary is that the molecular weights and amounts of materials be as noted above. Such compounds are i) polyethers containing at least 2, and no more than 6 hydroxyl groups in the case of polyol 1), and ii) polyethers containing three hydroxyl groups in the case of polyols 2) and 3), such as those known for the production of polyurethanes.

The polyethers used according to the present invention contain at least 2 and no more than 6 hydroxyl groups are known. They are prepared by the addition reaction of ethylene oxide (in the case of triol 3)) and propylene oxide to i) glycerin, trimethylolpropane, and mixtures thereof or ii) to amines. Useful amines include aliphatic, cycloaliphatic and/or aromatic monoamines, diamines or triamines, and monoalkanolamines, dialkanolamines, and/or trialkanolamines.

Specific useful amines include, e.g., aniline, monoethanolamine, diethanolamine, triethanol amine, propanolamine, the various straight and branched chain isomers of diaminopropane, diaminobutane, diaminopentane, diaminohexane, diaminoheptane, diaminooctane, diaminononane, and diaminodecane. Specific useful diamines also include 1,2- and 1,3-diaminopropane; 1,3-, 2,3-, and 1,4-diaminobutane; 1,2-diamino-2-methylpropane; 1,5-diaminopentane; 1,4-diamino-1-methylbutane; 1,4-diamino-2-methylbutane; 1,3-diamino-1-ethyl propane; 1,3-diamino-1,1-dimethylpropane; 1,3-diamino-1,2-dimethylpropane; 1,3-diamino-2,2-dimethylpropane; 1,5-diamino-2-methylpentane; 1,6-diaminohexane and the like. Useful alicyclic diamines include the various isomers of diaminocyclobutane, diaminocyclopentane, diaminocyclohexane, diaminocycloheptane, diaminocyclooctane, and diaminocyclononane. Also useful are the diamino-1-methylcyclohexanes; the methylenebis(cyclohexylamines); the diamino-1-methylcyclopentanes; the diaminodimethylcyclohexanes; isophorane diamine; and the like.

Representatives of the various hydroxyl group containing compounds which may be used according to the present invention have been described, e.g. in High Polymers, Vol. XVI, "Polyurethanes, Chemistry and Technology", by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Hochtlen, Carl-Hanser-Verlag, Munich, 1966, e.g. on pages 45 to 71. The only essential requirement in selecting the particular hydroxyl compound for the elastomer production is that the hydroxyl number and amount limitations set forth above be observed. It is only in using these narrow ranges of hydroxyl compounds that the elastomers of the present invention can be obtained.

Component B) of the reaction mixture useful herein is an organic diamine having a molecular weight of from 60 to 2000, and preferably from 100 to 400. Substantially any organic diamine can be used herein. Particularly preferred are diamines of the following general formula:

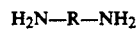

$$H_2N-R-NH_2$$

where R is a $C_3$ to $C_{10}$ straight or branched alkylene group, a $C_4$ to $C_{15}$ alicyclic group, or a $C_6$ to $C_{25}$ arylene group. Useful diamines include the various straight and branched chain isomers of diaminopropane, diaminobutane, diaminopentane, diaminohexane, diaminoheptane, diaminooctane, diaminononane, and diaminodecane. Specific useful diamines include 1,2- and 1,3-diaminopropane; 1,3-, 2,3-, and 1,4-diaminobutane; 1,2-diamino-2-methylpropane; 1,5-diaminopentane; 1,4-diamino-1-methylbutane; 1,4-diamino-2-methylbutane; 1,3-diamino-1-ethyl propane; 1,3-diamino-1,1-dimethylpropane; 1,3-diamino-1,2-dimethylpropane; 1,3-diamino-2,2-dimethyl-propane; 1,5-diamino-2-methylpentane; 1,6-diaminohexane and the like. Useful alicyclic diamines include the various isomers of diaminocyclobutane, diaminocyclopentane, diaminocyclohexane, diaminocycloheptane, diaminocyclooctane, and diaminocyclononane. Also useful are the diamino-1-methylcyclohexanes; the methylenebis(cyclohexylamines); the diamino-1-methylcyclopentanes; the diaminodimethylcyclohexanes; isophorone diamine; and the like. Also useful herein are the various known aromatic diamines such as meta-xylene diamine, phenylene diamine, methylene bis(phenyl diamine), toluene diamine, and diethyltoluene diamine, as well as the various aromatic diamines used in the polyurethane RIM art. Additional aromatic amines are described in U.S. Pat. No. 4,218,543, the disclosure of which is herein incorporated by reference.

Also useful are amine terminated polyethers such as the commercially available polyoxyalkylene diamines sold under the Jeffamine trademark by Texaco. Also useful are the aminocrotonate amino terminated polyethers described in U.S. application Ser. Nos. 07/523,769 (filed on May 15, 1990), 07/524,268 (filed on May 15, 1990) and 07/562,293 (filed on Aug. 3, 1990).

The presently preferred diamine is meta-xylene diamine.

Catalysts are also frequently used according to the invention. The catalysts added are generally known and include tertiary amines such as triethylamine, tributylamine, N-methylmorpholine, N-ethylmorpholine, N-cocomorpholine, N,N,N',N'-tetramethyl-ethylene-diamine, 1,4-diaza-bicyclo-(2,2,2)-octane, N-methyl-N'-dimethyl-aminoethylpiperazine, N,N-dimethylbenzylamine, bis-(N,N-diethyl-aminoethyl)-adipate, N,N-diethylbenzylamine, pentamethyl-diethylenetriamine, N,N-dimethylcyclohexylamine, N,N,N',N'-tetramethyl-1,3-butanediamine, N,N-dimethyl-β-phenylethylamine, 1,2-dimethyl imidazole, 2-methyl imidazole and the like. Also useful are the commercially available tertiary amines such as Niax Al and Niax A107, available from Union Carbide; Thancat DD, available from Texaco; and the like. Mannich bases known per se obtained from secondary amines such as dimethylamine and aldehydes, preferably formaldehyde, or ketones such as acetone, methyl ethyl ketone or cyclohexanone and phenols such as phenol, nonylphenol or bisphenol may also be used as catalysts. Examples of catalysts which consist of tertiary amines having hydrogen atoms which are reactive with isocyanate groups include triethanolamine, triisopropanolamine, N-methyldiethanolamine, N-ethyl-diethanol amine, N,N-dimethylethanol amine and their reaction products with alkylene oxides such as propylene oxide and/or ethylene oxide. Silaamines having carbon-silicon bonds as described, e.g., in German Patent No. 1,229,290 and U.S. Pat. No. 3,620,984 may also be used as catalysts. Examples include 2,2,4-trimethyl-2-silamorpholine and 1,3-diethylaminoethyl-tetramethyl-disiloxane. Basic nitrogen compounds such as tetraalkyl-ammonium-hydroxides, alkali metal hydroxides such as sodium phenolate and alkali metal alcoholates such as sodium methylate may also be used as catalysts. Hexahydrotriazines are also suitable catalysts. Organic metal compounds may also be used as catalysts according to the invention, in particular organic tin or bismuth compounds. The organic tin compounds used are preferably tin(II) salts of carboxylic acids such as tin(II) acetate, tin(II) octoate, tin(II) ethyl hexoate and tin(II) laurate and tin(IV) compounds such as dibutyl tin oxide, dibutyl tin dichloride, dibutyl tin diacetate, dibutyl tin dilaurate, dibutyl tin maleate or dioctyl tin diacetate. Examples of useful bismuth catalysts include bismuth neodecanoate, bismuth versalate, and various bismuth carboxylates. All the above-mentioned catalysts may, of course, be used as mixtures.

Further examples of catalysts which may be used according to the invention and details concerning the activity of the catalysts are known and are described, e.g., in Kunststoff-Handbuch, Volume VII, published by Vieweg and Hochtlen, Carl-Hanser-Verlag, Munich 1966, pages 96 to 102.

The moisture absorbing materials useful herein are known and are described in U.S. Pat. No. 3,755,222, and U.S. Pat. No. 4,695,618, the disclosures of which are herein incorporated by reference.

The fillers useful herein include silica, silica flour, barytes, talc, aluminum trihydrate, calcium carbonate, glass spheres, glass fibers and weaves, ceramic spheres and fibers, boron, carbon fibers, graphite, wollastonite, kieselguhr, organic fibers (such as polyamide fibers) and the like, and various coloring pigments such as carbon black, solvent black and the like.

The polysiloxane antifoaming agents are generally known in the coating art. Several types are commercially available. The presently preferred antifoaming agents are Foamex N and Foamex 3062, both available from Tego Chemie Service USA; AF 9000, available from General Electric; and Aqua Par-157, available from Akzo Chemicals Inc.

Useful aqueous polyurethane dispersions are also known and commerically available and include the following:

1) Bayhydrol 123, Bayhydrol PU402a, Bayhydrol 140AQ, Baybond XW114, and Imprani DLN, all available from Mobay Corporation;
2) Witcobond W290OH, available from Witco Corporation;
3) NeoRez R962, available from ICI Polyvinyl Chemicals;
4) Sancure 862 and Sancure 1507, both available from Sancor; and
5) Spensol L50, available from Reichold.

Also useful are the dispersions described in U.S. Pat. Nos. 4,108,814, 4,408,008, 4,742,095, and 4,879,322, all the disclosures of which are herein incorporated by reference, According to the invention, the components may be reacted together by known processes often using mechanical devices such as those described in U.S. Pat. No. 2,764,565. Details concerning processing apparatus which may be used according to the invention may be found in Kunststoff-Handbuch, Volume VII, published by Vieweg and Hochtlen, Carl-Hanser-Verlag, Munich, 1966, pages 121 and 205.

The invention is further illustrated but is not intended to be limited by the following examples in which all parts and percentages are by weight unless otherwise specified.

EXAMPLES

In the working examples which follow, the following materials were used:

PREPOLYMER: an isocyanate terminated prepolymer having an isocyanate group content of 27.6% and a viscosity of 235 cps., and being prepared by reacting a) Mondur MR-5 (a commercially available polymethylene polyphenyl polyisocyanate sold by Mobay Corporation, having an equivalent weight of about 129, and an isocyanate group content of 32.5%) with b) a glycerin/propylene oxide/ethylene oxide adduct (weight ratio of propylene oxide to ethylene oxide of about 5:1) having a primary OH group content of about 82% and an OH number of 28;

AMINE TRIOL: a monoethanolamine/propylene oxide adduct having an OH number of 700;

POLYOL A: a glycerin/propylene oxide adduct having an OH number of 250;

POLYOL B: a glycerin/propylene oxide/ethylene oxide adduct (weight ratio of propylene oxide to ethylene oxide of about 5:1) having a primary OH group content of about 82% and an OH number of 28;

XDA: meta-xylene diamine

BAYLITH: a commercially available zeolite having an average particle diameter of from 2 to 8 μm, sold as Baylith L powder by Mobay Corporation.

CALCIUM: calcium carbonate, available as GSP-40 from Genstar Stone Products, having an average particle size of 12.5 μm, a moisture content of 0.15% and a specific gravity of 2.7.

ATH: aluminum trihydrate, available as SB-336 from the Solem Division of J. M. Huber Corporation, having a median particle size of from 14 to 17 μm and a specific gravity of 2.42.

TIN: Dibutyl tin dilaurate, sold as T-12 by Air Products;

BAYHYDROL 140AQ: a 40% solids aqueous anionic polyurethane dispersion prepared according to U.S. Pat. No. 4,408,008 from a) a 1700 molecular weight polyester diol from hexane diol, neopentyl glycol and adipic acid, b) a monohydroxy polyether of 2145 molecular weight, c) sulfonate diol, d) 4,4'-methlenebis(cyclohexyl isocyanate), e) hexamethylene diisocyanate, f) 2-methyl-1,5-pentane diamine, and g) hydrazine, commercially available from Mobay Corporation; BAYBOND XW114: a 40% solids aqueous anionic polyurethane dispersion prepared according to U.S. Pat. No. 4,408,008 from a) a 1700 molecular weight polyester diol from hexane diol, neopentyl glycol and adipic acid, b) a monohydroxy polyether of 2145 molecular weight, c) sulfonate diol, d) isophorone diisocyanate, e) 4,4'-methylenebis(cyclohexyl isocyanate), f) N-methyl-2-pyrrolidone, g) isopropanol, h) isophorone diamine and i) diethylene triamine, commercially available from Mobay Corporation;

BAYHYDROL PU402A: a 40% solids aqueous anionic polyurethane dispersion prepared according to U.S. Pat. No. 4,408,008 from a) a 1700 molecular weight polyester diol from hexane diol, neopentyl glycol and adipic acid, b) a monohydroxy polyether of 2145 molecular weight, c) sulfonate diol, d) hexamethylene diisocyanate), e) isophorone diisocyanate, f) isophorone diamine and g) hydrazine, commercially available from Mobay Corporation.

In the examples, physical testing results are reported. The tests used were as follows:

1) Density: ASTM D-792;
2) Tensile strength: ASTM D-412;
3) Elongation: ASTM D-412;
4) Flex modulus: ASTM D-790;
5) Dart impact: ASTM D-3763;
6) Hardness: ASTM D-2240;
7) Steel ball: This test was performed on an enamel-steel-enamel-polyurethane composite bathtub. A ⅛" steel ball was dropped vertically from a height of 30 inches at three points (front, center, and back) onto the enamel side of the empty bathtub. A decibel meter was placed 6" above the front end of the bathtub for all readings to record the sound level. The average of three readings was reported in decibel-a units (db-a).

8) Water sound emission: This test was also performed on an enamel-steel-enamel-polyurethane composite bathtub. A shower nozzle, with water at about 60 psi pressure is allowed to spray water onto the enamel side of the tub from a height of 5 feet to simulate a person taking a shower. A decibel meter placed one inch under the polyurethane records the sound level while the water is sprayed. Recordings were measured in decibel-a units at three different locations (front, center and back of the tub).

9) Heat retention: This test was also performed on an enamel-steel-enamel-polyurethane composite bathtub. Twenty five gallons of potable water at 47° C. were poured into the bathtub. A digital thermocouple was placed in the water and on the polyurethane side. Temperature readings were recorded every minute for 10 minutes. The recorded temperature represents the drop in water temperature after ten minutes.

10) Delamination: If at any time during testing the polyurethane cracked or peeled away (to any extent) from the enamel layer, it was considered a delaminated sample.

EXAMPLE 1

BAYHYDROL 140AQ was sprayed using an atomizer gun onto a 12 inch by 12 inch ceramic enamel plaque (ceramic enamel layer was coated on a metal substrate, and henceforth is denoted as substrate), at a wet thickness of 0.25 mm. The polyurethane coated substrate was allowed to dry for 5 minutes and then cured in an oven at 37.8° C. for 30 minutes. The cured polyurethane dispersion now acts as the adhesive.

Into a drum were added 2143 parts of AMINE TRIOL, 1452 parts of POLYOL A, 1048 parts of POLYOL B and 119 parts of a XDA. The mixture was mixed for 10 minutes. 238 parts of BAYLITH were then added and the mixture mixed for another 15 minutes. 4000 parts of CALCIUM and 1000 parts of ATH were added and blended for 20 minutes. Finally, 1 part of TIN was added to the mixture. The total blend ("component B") was then mixed for 15 minutes.

Component B and PREPOLYMER were mixed in a spray gun with a static mixer using spray equipment equipped with a metering pump and sprayed as a backing onto the polyurethane adhesive, at a ratio of 1 part of PREPOLYMER to 2 parts of Component B, and at a temperature of 60° C. (spray pressure of approximately 10 MPa or 1500 psi). The isocyanate index of the system was about 1.11. The viscosity of PREPOLYMER was around 250 cps and of component B was 3700 cps.

The backing formed a 2 mm thick layer, which was tackfree in 100 seconds. The density of the sample was 1.44 gm/cc. The substrate with the polyurethane backing was subjected to a thermal shock cycle which consisted of placing the sample in a cold chamber at −15° C. for 45 minutes and then placing it in an oven at 100° C. for 45 minutes. The sample resisted delamination for 25 cycles. The cycling was continued for another 25 cycles. No delamination was observed.

The polyurethane without the substrate was tested to determine its physical properties. The following properties were obtained:

| | | |
|---|---|---|
| Steel ball | 73 | tested composite tub |
| Water sound emission | 74 | tested composite tub |
| Heat Retention | 2° F. | tested composite tub |
| Tensile strength, psi | 2158 | |
| Elongation, % | 6.1 | |
| Flex Modulus, psi | 109,900 | |
| Dart Impact, ft-lbs | 1.5 | |

EXAMPLE 2

Into a drum were added 1357 parts of AMINE TRIOL, 1381 parts of POLYOL A, 1905 parts of POLYOL B and 119 parts of XDA. The mixture was mixed for 10 minutes. 238 parts of BAYLITH were then added and the mixture mixed for another 15 minutes. 4000 parts of CALCIUM and 1000 parts of ATH were added and blended for 20 minutes. 8 parts of TIN were then added. The total blend ("component B") was then mixed for 15 minutes.

Component B and PREPOLYMER were mixed in a can in the ratio of 1 part of PREPOLYMER to 2 parts of component B, and poured into a mold to produce a sheet with hardness of Shore 77D. The mixed material gelled in 35 seconds.

EXAMPLE 3

BAYBOND XW114 was sprayed using an atomizer gun onto a 12 inch by 12 inch ceramic enamel plaque (ceramic enamel layer was coated on a metal substrate, and henceforth is denoted as substrate), at a wet thickness of 0.25 mm. The polyurethane coated substrate was allowed to dry for 5 minutes and then cured in an oven at 37.8° C. for 30 minutes. The cured polyurethane dispersion acted as the adhesive.

In a drum were added 1024 parts of AMINE TRIOL, 2429 parts of POLYOL A, 1190 parts of POLYOL B and 119 parts of XDA. The mixture was mixed for 10 minutes. 238 parts of a BAYLITH were then added and the mixture mixed for an additional 15 minutes. 4000 parts of CALCIUM and 1000 parts of ATH were added and blended for 20 minutes. 3 parts of TIN were then added. The total blend ("component B") was mixed for 15 minutes.

Component B and PREPOLYMER were mixed in a spray gun with a static mixer using spray equipment equipped with a metering pump and sprayed as a backing onto the polyurethane adhesive, at a ratio of 1 part of PREPOLYMER to 2 parts of component B, and at a temperature of 60° C. (spray pressure of approximately 10 MPa or 1500 psi). The isocyanate index of the system was about 1.52. The viscosity of component B was 2500 cps.

The backing formed a 2 mm thick layer, which was tackfree in 100 seconds. The density of the sample was 1.44 gm/cc. The substrate with the polyurethane backing was subjected to a thermal cycle program. A cycle of this program consisted of placing the backed-substrate in a chamber at −15° C. for 30 minutes, heating the chamber from −15° C. to 90° C. in 40 minutes, maintaining the temperature of the chamber at 90° C. for 30 minutes and then cooling the chamber from 90° C. to −15° C. in 40 minutes. The sample resisted delamination for 50 cycles.

The backing without the substrate was tested to determine its physical properties. The following properties were obtained:

| | | |
|---|---|---|
| Steel ball | 67 | tested composite tub |
| Water sound emission | 73 | tested composite tub |
| Heat Retention | 3° F. | tested composite tub |
| Tensile strength, psi | 2681 | |
| Elongation, % | 25.6 | |
| Flex Modulus, psi | 91,600 | |
| Dart Impact, ft-lbs | 5.0 | |

EXAMPLE 4

BAYHYDROL PU402A was sprayed using an atomizer gun onto a 12 inch by 12 inch ceramic enamel plaque (ceramic enamel layer was coated on a metal substrate, and henceforth is denoted as substrate), at a wet thickness of 0.25 mm. The polyurethane coated substrate was allowed to dry for 5 minutes and then cured in an oven at 37.8° C. for 30 minutes. The cured polyurethane dispersion acted as the adhesive.

In a drum were added 2250 parts of AMINE TRIOL, 1525 parts of POLYOL A, 1100 parts of POLYOL B and 125 parts of XDA. The mixture was mixed for 25 minutes. No moisture scavenger (BAYLITH) was added. 4000 parts of CALCIUM and 1000 parts of ATH were added and blended for 20 minutes. Finally 1 gm of TIN was added. The total blend ("component B") was then mixed for 15 minutes Component B and PREPOLYMER were mixed in a spray gun with a static mixer using spray equipment equipped with a metering pump and sprayed as a backing onto the polyurethane adhesive, at a ratio of 1 part of PREPOLYMER to 2 parts of component B, and at a temperature of 60° C. (spray pressure of approximately 10 MPa or 1500 psi). The isocyanate index of the system was about 1.06. The viscosity of component B was 3000 cps.

The backing formed a 4 mm thick layer, which was tackfree in 85 seconds. Due to the absence of the moisture scavenger, the backing was microcellular in nature, from the reaction of PREPOLYMER with residual water in the system.

The substrate with the polyurethane backing was subjected to a thermal shock program. A cycle of this program consisted of placing the backed-substrate in a cold chamber at −15° C. for 40 minutes, and then placing it in an oven at 100° C. for 40 minutes. The sample resisted delamination for 25 cycles, after which testing was stopped.

EXAMPLE 5

BAYBOND XW114 was sprayed using an atomizer gun onto a 12 inch by 12 inch ceramic enamel plaque (ceramic enamel layer was coated on a metal substrate, and henceforth is denoted as substrate), at a wet thickness of 0.25 mm. The polyurethane coated substrate was allowed to dry for 5 minutes and then cured in an oven at 37.8° C. for 30 minutes. The cured polyurethane dispersion acted as the adhesive.

Into a drum were added 2143 parts of AMINE TRIOL, 1452 parts of POLYOL A, 1048 parts of POLYOL B and 119 parts of XDA. The mixture was mixed for 10 minutes. 238 parts of BAYLITH were then added and the mixture mixed for a further 15 minutes. 4000 parts of CALCIUM and 1000 parts of ATH were added and blended for 30 minutes. No catalyst was added. The total blend (component B") had a viscosity of 3200 cps.

Component B and PREPOLYMER were mixed in a spray gun with a static mixer using spray equipment equipped with a metering pump and sprayed as a backing onto the polyurethane adhesive, at a ratio of 1 part of PREPOLYMER to 2 parts of component B, and at a temperature of 60° C. (spray pressure of approximately 10 MPa or 1500 psi). The isocyanate index of the system was about 1.11.

The backing formed a 6 mm thick layer, which was tackfree in 107 seconds. The density of the sample was 1.44 gm/cc. The substrate with the polyurethane backing was subjected to a thermal shock program. A cycle of this program consisted of placing the sample in a cold chamber at −15° C. for 40 minutes and then placing it in an oven at 100° C. for 40 minutes. The sample resisted delamination for 25 cycles, after which testing was stopped.

EXAMPLE 6

BAYHYDROL PU402A was sprayed using an atomizer gun onto a 12 inch by 12 inch ceramic enamel plaque (ceramic enamel layer was coated on a metal substrate, and henceforth is denoted as substrate), at a +wet thickness of 0.25 mm. The polyurethane coated substrate was allowed to dry for 5 minutes and then cured in an oven at 37.8° C. for 30 minutes. The cured polyurethane dispersion acted as the adhesive.

Into a drum were added 2262 parts of a POLYOL A, 2381 parts of POLYOL B and 125 parts of XDA. The mixture was mixed for 25 minutes. 238 parts of BAYLITH were then added and the mixture mixed for a further 15 minutes. 4000 parts of CALCIUM and 1000 parts of ATH were added and blended for 20 minutes. Finally 1 part of TIN was added. The total blend ("component B") was mixed for 15 minutes.

Component B and PREPOLYMER were mixed in a spray gun with a static mixer using spray equipment equipped with a metering pump and sprayed as a backing onto the polyurethane adhesive, at a ratio of 1 part of PREPOLYMER to 2 parts of component B, and at a temperature of 60° C. (spray pressure of approximately 10 MPa or 1500 psi). The isocyanate index of the system was about 1.06. The viscosity of component B was 3000 cps.

The backing formed a 2 mm thick layer, which was tackfree in 50 seconds. The density of the sample is 1.44 gm/cc. The substrate with the polyurethane backing was subjected to a thermal shock program. A cycle of this program consisted of placing the sample in a cold chamber at −15° C. for 40 minutes, and then placing it in an oven at 100° C. for 40 minutes. The sample resisted delamination for 25 cycles, after which testing was stopped.

EXAMPLE 7

A comparative study was performed to determine the adhesive best suited for the application. Different adhesives or dispersions were used in the study. Adhesive X ('X' being the adhesive as indicated below, in the table) was sprayed using an atomizer gun onto a 12 inch by 12 inch ceramic enamel plaque (ceramic enamel layer was coated on a metal substrate, and henceforth is denoted as substrate), at a wet thickness of 0.25 mm. The coated substrate was allowed to dry for 5 minutes and then cured in an oven at 37.8° C. for 30 minutes.

Into a drum were added 2143 parts of AMINE TRIOL, 1452 parts of POLYOL A, 1048 parts of POLYOL B and 119 parts of XDA. The mixture was mixed for 10 minutes. 238 parts of BAYLITH were then added and the mixture mixed for a further 15 minutes. 4000 parts of CALCIUM and 1000 parts of ATH were added and blended for 20 minutes. Finally 1 part of TIN was added. The total blend ("component B") was mixed for 15 minutes Component B and PREPOLYMER were mixed in a spray gun with a static mixer using spray equipment equipped with a metering pump and sprayed as a backing onto the adhesive, at a ratio of 1 part of PREPOLYMER to 2 parts of component B, and at a temperature of 60° C. (spray pressure of approximately 10 MPa or 1500 psi). The isocyanate index of the system was about 1.11. The viscosity of component B was 3700 cps.

The backing formed a 2 mm thick layer, which was tackfree in 100 seconds. The substrate with the polyurethane backing was subjected to a thermal shock program which consisted of placing the sample in a cold chamber at −15° C. for 45 minutes and then placing it in an oven at 100° C. for 45 minutes. Based on the adhesive used, the following results were observed of the ability of the samples to resist delamination:

|  | No. of cycles before delamination occurs |
| --- | --- |
| No adhesive | 2 |
| Mondur MR isocyanate (a commercially available polymethylene polyphenyl polyisocyanate sold by Mobay Corporation, having an equivalent weight of about 133, and an isocyanate group content of 32.1% isocyanate | 1 |
| Heat oxidation - No adhesive was used. Instead, the plaque surface was subjected to an oxyacetylene torch flame. Two complete passes were made over the whole plaque. The total time for both passes was 10 seconds. | 2 |
| Silane coupling agents: two different silanes were tested: | |
| 1) Chemlok AP-134: available from Lord Corporation: | 3 |
| 2) Thixon 405, available from Whittaker Corporation: | 3 |
| Epoxyfunctional silane coupling agent Silane A-187, from Union Carbide Corporation: | 9 |
| Polyaminofunctional silane coupling agent Silane A-1130: from Union Carbide Corporation: | 10 |
| BAYHYDROL PU402A: | >50 |
| BAYBOND XW114: | >50 |
| BAYHYDROL 140AQ: | >50 |

Also subjected to the thermal shock cycle was a commercially available substrate backed with a copolymer of polyurethane-polyester using a commercially available silane coupling agent as the adhesive layer as described in U.S. Pat. No. 4,664,982. Slight edge (1%) delamination was observed after 25 cycles.

EXAMPLE 8

A comparative study was then conducted at different filler loadings.

Into a drum were added 1024 parts of AMINE TRIOL, 2429 parts of POLYOL A, 1190 parts of POLYOL B and 119 parts of XDA. The mixture was mixed for 10 minutes. 238 parts of BAYLITH were then added and the mixture mixed for an additional 15 minutes. Different amounts of CALCIUM were then added and blended for 20 minutes. Finally, 1 part of TIN was added. The total blend ("component B") was then mixed for 15 minutes.

Component B and PREPOLYMER were mixed in a spray gun with a static mixer using spray equipment equipped with a metering pump and sprayed as a backing onto an extruded acrylic sheet of 1/16 inch thickness (manufactured by Plaskolite Inc. and sold under the Optix trademark), at a ratio of 1 part of PREPOLYMER to 2 parts of component B, and at a temperature of 60° C. (spray pressure of approximately 10 MPa or 1500 psi). The isocyanate index of the system was about 1.52.

The following results were obtained:

| Amount of calcium carbonate | Conclusion/Comments |
| --- | --- |
| 300 parts | Very high gel time. Too tacky to touch and handle before 6 hours. Part had very weak strength before six hours. If immersed in water, part swelled. |
| 500 parts | Better than above, but slightly high gel time. Too tacky to handle before 3 hours. Part has very weak strength before 3 hours. If immersed in water, swelling occurs. |
| 1000 parts | Tack free in 3 minutes; Can handle in 15 minutes. |
| 3300 parts | Tack free in 5 minutes; can handle in 15 minutes. |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a composite structure comprising:
   1. applying an aqueous anionic polyester polyurethane dispersion to the ceramic enamel layer of a metal substrate having a ceramic enamel layer on at least one side thereof,
   2. allowing said dispersion to cure thereby forming an adhesive layer,
   3. applying a reaction mixture onto said adhesive layer, said reaction mixture comprising:
      A. a polyol mixture comprising:
         1. from 20 to 50 parts by weight of a polyol having an OH number of from 500 to 750 and being prepared by reacting propylene oxide with a mono-, di-, or trialkanolamine, or by reacting propylene oxide with a mono-, di-, or triamine,
         2. from 25 to 55 parts by weight of a triol having an OH number of from 200 to 325 and being prepared by reacting propylene oxide with a member selected from the group consisting of glycerin, trimethylolpropane, and mixtures thereof, and
         3. from 20 to 50 parts by weight of a triol having an OH number of from 20 to 50 and being prepared by reacting propylene oxide and ethylene oxide with a member selected from the group consisting of glycerin, trimethylolpropane, and mixtures thereof, said triol 3) having a primary hydroxyl content of from 50 to 90%, said parts by weight of 1), 2), and 3) totalling 100 parts by weight,
      B. from 1 to 5 parts by weight per 100 parts by weight of component A) of an organic diamine having a molecular weight of from 60 to 2000,
      C. from 2 to 6 parts by weight per 100 parts by weight of component A) of one or more additives to absorb moisture,
      D. from 0 to 2 parts by weight per 100 parts by weight of component A) of one or more catalysts capable of catalyzing the reaction between an isocyanate group and a hydroxyl group,
      E. from 60 to 110 parts by weight per 100 parts by weight of component A) of one or more fillers,
      F. from 0 to 2 parts by weight per 100 parts by weight of component A) of one or more silicone anti-forming agents, and
      G. an isocyanate terminated prepolymer prepared by reacting a polyisocyanate with a polyether polyol, said prepolymer having an NCO content of from 18 to 35% by weight, at an equivalent ratio of isocyanate groups to isocyanate reactive groups of from 0.7:1 to 2.0:1, and
   4. allowing said reaction mixture to fully react.

2. The process of claim 1, wherein said organic diamine has a molecular weight of from 100 to 400.

3. The process of claim 2, wherein said organic diamine is meta-xylene diamine.

4. The product produced according to the process of claim 1.

* * * * *